US012288955B2

(12) United States Patent
Gebhardt

(10) Patent No.: US 12,288,955 B2
(45) Date of Patent: Apr. 29, 2025

(54) CONNECTION ARRANGEMENT AND ELECTRONIC DEVICE

(71) Applicant: Phoenix Contact GmbH & Co. KG, Blomberg (DE)

(72) Inventor: Martin Gebhardt, Porta Westfalica (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 331 days.

(21) Appl. No.: 17/775,895

(22) PCT Filed: Nov. 10, 2020

(86) PCT No.: PCT/EP2020/081553

§ 371 (c)(1),
(2) Date: May 11, 2022

(87) PCT Pub. No.: WO2021/099174

PCT Pub. Date: May 27, 2021

(65) Prior Publication Data

US 2022/0416448 A1 Dec. 29, 2022

(30) Foreign Application Priority Data

Nov. 19, 2019 (DE) ..................... 10 2019 131 146.2

(51) Int. Cl.
*H01R 4/00* (2006.01)
*H01R 4/48* (2006.01)

(52) U.S. Cl.
CPC ........... *H01R 4/484* (2023.08); *H01R 4/4833* (2023.08); *H01R 4/4835* (2023.08); *H01R 4/4821* (2023.08)

(58) Field of Classification Search
CPC .................................................. H01R 4/48365
See application file for complete search history.

(56) References Cited

U.S. PATENT DOCUMENTS 7,115,001 B1 10/2006 Brockman et al.
9,343,826 B2 * 5/2016 Moret Codina ..... H01R 4/2433
(Continued)

FOREIGN PATENT DOCUMENTS

DE 202006009460 U1 3/2007
DE 202013100740 U1 3/2013
(Continued)

*Primary Examiner* — Abdullah A Riyami
*Assistant Examiner* — Thang H Nguyen
(74) *Attorney, Agent, or Firm* — LEYDIG, VOIT & MAYER, LTD.

(57) ABSTRACT

A connection arrangement for connecting an electrical conductor includes: a housing; a busbar; a clamping spring including a clamping leg transferrable into a clamping position and into a release position; a conductor connection space formed between a section of the busbar and the clamping leg of the clamping spring; a displaceably arranged guide element, which is in operative connection with the clamping leg of the clamping spring, the clamping leg being holdable in the release position by the guide element; a release element, which, in the release position of the clamping leg of the clamping spring, is in engagement with the guide element, the release element during insertion of the conductor to be connected into the conductor connection space being actuatable thereby such that the release element comes out of engagement with the guide element and the guide element is displaceable by a spring force of the clamping leg.

20 Claims, 12 Drawing Sheets

(56) References Cited

U.S. PATENT DOCUMENTS

| | | | | |
|---|---|---|---|---|
| 10,367,276 | B2 * | 7/2019 | Wu | H01R 9/223 |
| 10,553,978 | B2 * | 2/2020 | Juelich | H01R 13/193 |
| 10,879,630 | B2 * | 12/2020 | Mastel | H01R 4/4835 |
| 11,387,580 | B2 * | 7/2022 | Fehling | H01R 4/4833 |
| 11,545,764 | B2 * | 1/2023 | Meyer | H01R 43/16 |
| 11,664,609 | B2 * | 5/2023 | Tuerkekoele | H01R 4/4835 439/441 |
| 2007/0099479 | A1 * | 5/2007 | Holterhoff | H01R 4/4835 439/441 |
| 2018/0331449 | A1 | 11/2018 | Juelich et al. | |
| 2019/0190168 | A1 | 6/2019 | Witte et al. | |
| 2019/0386407 | A1 * | 12/2019 | Mastel | H01R 4/4835 |
| 2020/0220302 | A1 * | 7/2020 | Schroeder | H01R 13/432 |
| 2021/0057830 | A1 * | 2/2021 | Fehling | H01R 9/2408 |
| 2024/0030628 | A1 * | 1/2024 | Schmitz | H01R 9/2491 |

FOREIGN PATENT DOCUMENTS

| | | | |
|---|---|---|---|
| DE | 202014103797 | U1 | 11/2014 |
| DE | 102015118574 | A1 | 5/2017 |
| DE | 202016104971 | U1 | 12/2017 |
| DE | 102016115601 | A1 | 3/2018 |
| DE | 202019101246 | U1 | 6/2019 |
| JP | H05135809 | A | 6/1993 |
| JP | H0668915 | U1 | 3/1994 |
| JP | 2004087340 | A | 3/2004 |

* cited by examiner

CONNECTION ARRANGEMENT AND ELECTRONIC DEVICE

CROSS-REFERENCE TO PRIOR APPLICATIONS

This application is a U.S. National Phase application under 35 U.S.C. § 371 of International Application No. PCT/EP2020/081553, filed on Nov. 10, 2020, and claims benefit to German Patent Application No. DE 10 2019 131 146.2, filed on Nov. 19, 2019. The International Application was published in German on May 27, 2021 as WO 2021/099174 under PCT Article 21(2).

FIELD

The invention relates to a connection arrangement for connecting an electrical conductor. The invention further relates to an electronic device.

BACKGROUND

Such connection arrangements usually have a clamping spring designed as a leg spring, which clamping spring has a retaining leg and a clamping leg, wherein a conductor inserted into the connection arrangement can be clamped against the busbar by means of the clamping leg of the clamping spring. If, in particular, flexible conductors are clamped, before insertion of the conductor it will be necessary to move the clamping spring first into a release position by means of an actuating element and thus to actuate it, in order to pivot the clamping spring or the clamping leg away from the busbar so that the conductor can be inserted into the intermediate space between the busbar and the clamping spring. Only with rigid and thus robust conductors can the conductor apply sufficient force to the clamping spring or the clamping leg of the clamping spring to be able to pivot the clamping leg away from the busbar without the actuating element having to be actuated for this purpose by a user. With flexible conductors, the user must first pivot the clamping spring away from the busbar by actuating the actuating element so that the flexible conductor can be inserted. In order to clamp the inserted conductor, the actuating element must be manually actuated once more by the user in order to move the clamping spring from the release position into the clamping position. Manual actuation of the actuating element by the user makes mounting or connecting the conductor difficult for the user, because handling is cumbersome and the time required thus increases as well.

SUMMARY

In an embodiment, the present invention provides a connection arrangement for connecting an electrical conductor, comprising: a housing; a busbar; a clamping spring comprising a clamping leg transferrable into a clamping position and into a release position; a conductor connection space formed between a section of the busbar and the clamping leg of the clamping spring; a displaceably arranged guide element, which is in operative connection with the clamping leg of the clamping spring, the clamping leg being holdable in the release position by the guide element; a release element, which, in the release position of the clamping leg of the clamping spring, is in engagement with the guide element, the release element during insertion of the conductor to be connected into the conductor connection space being actuatable thereby such that the release element comes out of engagement with the guide element and the guide element is displaceable by a spring force of the clamping leg such that the clamping leg is transferred into the clamping position in order to clamp the conductor against the busbar; and an actuating element, by which the guide element is displaceable in order to transfer the clamping leg of the clamping spring from the clamping position into the release position, wherein the actuating element has a display element configured to indicate a connection state of the electrical conductor.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
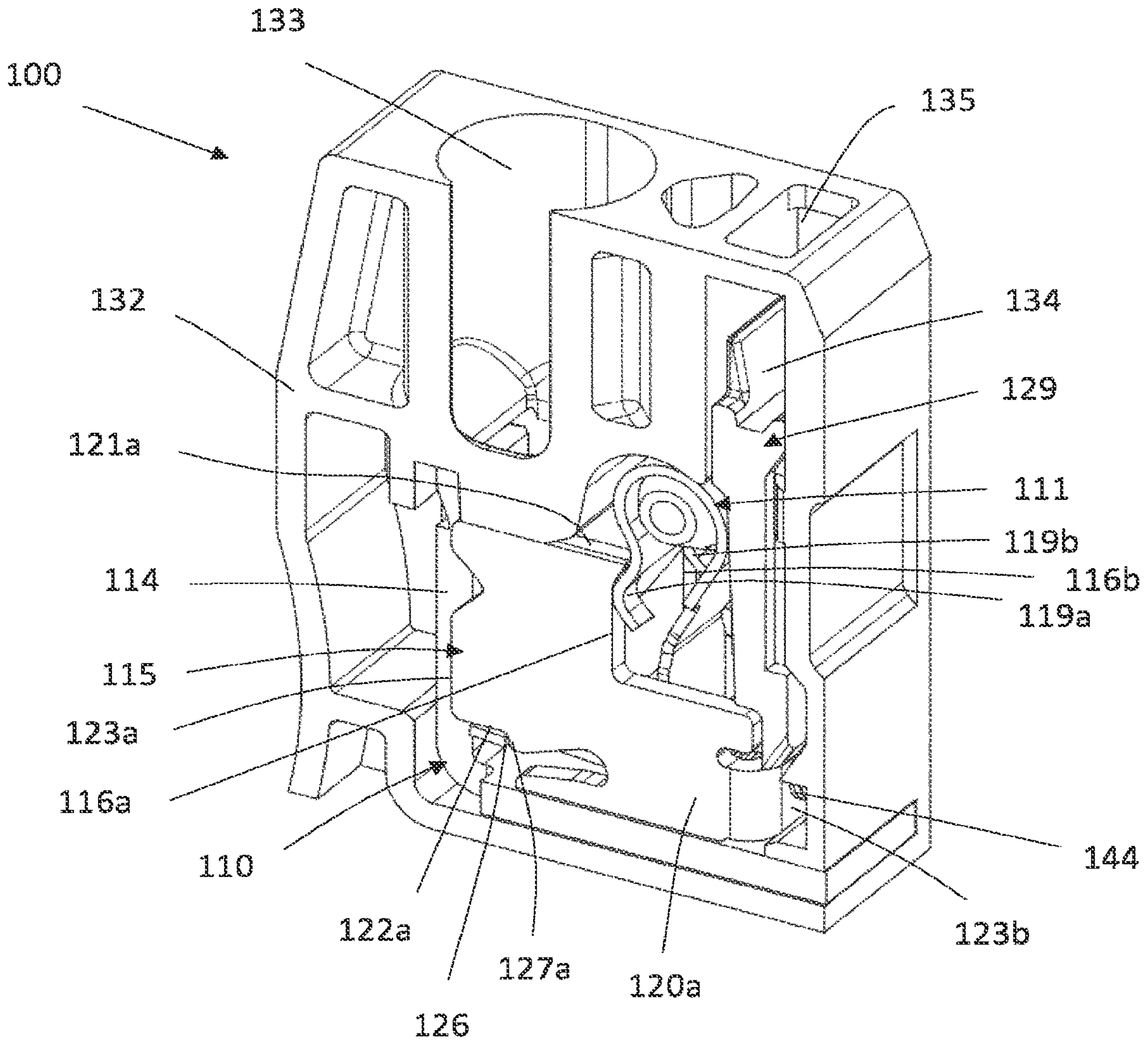
FIG. 1 is a schematic representation of a connection arrangement according to the invention with the clamping leg of the clamping spring in a release position.

In an embodiment, the present invention provides a connection arrangement and an electronic device with which connecting, in particular, of flexible conductors can be simplified.

The connection arrangement according to the invention has a housing, a busbar, a clamping spring which has a clamping leg which can be transferred into a clamping position and into a release position, a conductor connection space formed between a section of the busbar and the clamping leg of the clamping spring, a displaceably arranged guide element, which is in operative connection with the clamping leg of the clamping spring, wherein the clamping leg can be held in the release position by means of the guide element, and a release element which in the release position of the clamping spring is in engagement with the guide element. When the conductor to be connected is being inserted into the conductor connection space, the release element can be actuated by the conductor connection space in such a way that the release element comes out of engagement with the guide element and the guide element can be displaced by a spring force of the clamping leg in such a way that the clamping leg is transferred into the clamping position in order to clamp the conductor against the busbar. The connection arrangement also has an actuating element, by means of which the guide element can be displaced from the clamping position into the release position in order to transfer the clamping leg of the clamping spring into the release position, wherein the actuating element has a display element for indicating a connection state of the electrical conductor.

By means of the connection arrangement according to the invention, even a flexible conductor can now be connected without manual actuation of, for example, an actuating element or without the assistance of a tool, and be clamped against the busbar. The clamping spring is preferably designed as a leg spring which has a retaining leg and a clamping leg designed to be pivoted relative to the retaining leg. By means of a pivoting movement of the clamping leg, the clamping leg can be guided into a release position, in which the clamping leg is arranged at a distance from the busbar, and a conductor that is to be connected can be guided into or out of a conductor connection space formed thereby between the busbar and the clamping leg, and can be moved into a clamping position in which the clamping leg can rest against the busbar or against the connected conductor in order to clamp the conductor against the busbar. The connection arrangement has a guide element mounted in particular horizontally displaceably, which is preferably operatively connected to the clamping spring both in the release position and in the clamping position of the clamping leg of the clamping spring, which means that the clamping leg, due to the operative connection with the guide element, can follow the displacement movement and thus the position of the guide element. The guide element holds the clamping leg in the release position against its spring force by the guide element pressing against the clamping leg. To be able to hold the guide element in this position, the guide element is in engagement with the release element in the release position of the clamping leg of the clamping spring. When the release element is in engagement with the guide element, a displacement movement of the guide element will not be possible or will be stopped. Via an operative connection or coupling of the release element to the guide element and of the guide element to the clamping leg of the clamping spring in the release position of the clamping leg, the clamping leg can be held in this release position without additional manual actuation, so that in particular a flexible conductor can be inserted into the conductor connection space thereby free between the busbar and the clamping spring. The release element can have a pressure surface facing in the direction of the conductor connection space, which can be arranged flush with an insertion region of the conductor in the connection arrangement or flush with the conductor connection space, so that the conductor rests against the pressure surface of the release element during insertion into the connection arrangement, as a result of which a compressive force can be applied by the conductor to the release element. By applying a compressive force to the pressure surface by means of the conductor and thus to the release element, the release element can be brought into a pivoting movement or tilting movement in the direction of the insertion direction of the conductor so that the release element can be pivoted or tilted away from the guide element in the insertion direction of the conductor. As a result of the pivoting movement of the release element, the release element can be brought out of engagement with the guide element, so that the guide element is freely displaceable again and the guide element can thereby be displaced solely by the spring force of the clamping leg without manual assistance in such a way that the clamping leg can be transferred from the release position into the clamping position. By means of this special mechanism, a flexible conductor can be connected in a particularly simple manner solely by the insertion movement of the conductor, without a user needing to actuate further elements, such as an actuating element, in order to release the clamping spring and move it from the release position into the clamping position. This facilitates the handling of the connection arrangement and saves time when connecting a conductor. The release element is preferably an element formed separately from the clamping spring, the busbar and the guide element. The release element preferably extends over the region between the section of the busbar against which a conductor can be clamped, and the clamping spring, so that the release element can delimit the conductor connection space to one side. The guide element can take the form of a slide element.

According to the invention, the connection arrangement also has an actuating element, by means of which the guide element can be displaced in order to transfer the clamping leg of the clamping spring from the clamping position into the release position. The actuating element can preferably be designed such that it exerts a compressive force on the guide element in order to displace it against the spring force of the clamping leg of the clamping spring in such a way that the guide element can engage with the release element when the release position of the clamping leg is reached. Due to the displacement movement, the guide element can apply a tensile force to the clamping leg of the clamping spring in order to transfer the clamping leg from the clamping position into the release position. The actuating element is preferably movable in a direction which is oriented transversely to the direction of the displacement movement of the guide element. The actuating element is preferably movable purely translationally. The direction of the movement of the actuating element is preferably oriented parallel to the insertion direction of the conductor into the conductor connection space. In order to make it possible for a user to make the connection state of the electrical conductor visually apparent on the connection arrangement, the actuating element has a display element for displaying the connection state of the electrical conductor. Due to the display element, the user can visually recognize whether the electrical conductor introduced into the connection arrangement is already clamped against the busbar by means of the clamping spring, or whether the conductor is already inserted into the housing of the connection arrangement but the release element has not yet been released and the clamping spring has therefore not yet reached a clamping position. Irrespective of the size of the diameter of the electrical conductor, the display element formed on the actuating element enables a constant visual feedback about the connection state of the conductor to be connected.

The connection arrangement can, for example, be part of a clamp terminal, a terminal block or a plug-in connector. A plurality of connection points can also be provided in the housing of a connection arrangement, wherein each connection point has a corresponding busbar, a corresponding clamping spring, a corresponding actuating element, a corresponding guide element and a corresponding release element, so that the connection points arranged in a housing are preferably all of the same design.

The display element is preferably formed on an end section of the actuating element which, in a connected state of the conductor, can project from an opening of a housing, so that, in a connected state of the conductor, at least a partial region of the display element can project from the opening of the housing. This enables clear visual feedback for a user in order to indicate to the user that the conductor is clamped between the clamping spring and the busbar and is thus connected. If the conductor is not yet clamped and is therefore not connected, the end section of the actuating element and thus the display element will preferably still be inside the housing and not be projecting from the opening of the housing, so that the display element will not yet be visible for a user. The position of the display element alone makes it easy to display the connection status of the electrical conductor visually to a user.

The display element can be designed, for example, in the form of a wedge-shaped extension at the end section of the actuating element. In the connected state of the conductor, this wedge-shaped extension can project from the opening of the housing in a clearly visible manner. The wedge-shaped extension preferably has a smaller width and/or a smaller thickness than the rest of the actuating element.

For actuating the actuating element, the actuating element can have a tool receiving region, wherein the display element is then preferably arranged adjacent to the tool receiving region. The tool receiving region can, for example, be of a slot-shaped design in order to be able to receive a tool, such as a screwdriver. By arranging the display element adjacent to the tool receiving region, the display element can simultaneously form a kind of guidance aid for the tool as it moves towards the tool receiving region. In addition, the display element can form a contact edge for the tool inserted into the tool receiving region when the actuating element is being actuated by means of the tool.

The actuating element is preferably arranged such that it does not penetrate into the conductor connection space, so that an interaction of the actuating element with the connected conductor can be prevented. On the other hand, the clamping spring, the busbar and the actuating element are preferably arranged such that the clamping spring is arranged between the section of the busbar against which a conductor to be connected is clamped and the actuating element. As a result, handling of the connection arrangement can be significantly simplified for a user when an electrical conductor is being connected, since the actuating element is positioned away from the conductor connection space and thus the insertion of a conductor is not hindered by the actuation of the actuating element.

In order to be able to form an operative connection between the guide element and the clamping leg of the clamping spring, it can be provided that the guide element has at least one spring contact edge against which the clamping leg can rest. The spring contact edge can be designed such that the clamping leg or at least a part of the clamping leg can rest against the spring contact edge both in the release position and in the clamping position. The spring contact edge can be formed, for example, on a shoulder of the guide element.

In order to be able to achieve a uniform guidance of the guide element and the clamping leg of the clamping spring, two such spring contact edges can be formed on the guide element, so that the clamping leg can be guided on the guide element via two such spring contact edges. The two spring contact edges preferably extend parallel to each other on the guide element.

With such a design it is possible for the clamping leg to have two slide sections each arranged laterally in relation to a main section having a clamping edge, and for the guide element to have two spring contact edges arranged at a distance from each other, wherein a first slide section can rest against a first spring contact edge and a second slide section can rest against a second spring contact edge. The two slide sections preferably each have a shorter length than the main section of the clamping leg. The main section and the two slide sections preferably extend parallel to each other. The two slide sections are in each case preferably curved so that they can each form a skid which can slide along a respective spring contact edge. However, the main section is preferably straight.

The guide element is preferably displaceable in such a way that a displacement movement of the guide element transversely to an insertion direction of the conductor to be connected into the conductor connection space can take place. In this way, a particularly compact design is possible, as a result of which the connection arrangement can be characterized by a reduced installation space.

In order to release the release element from the guide element by means of the conductor inserted into the conductor connection space and thus to be able to disengage it from the guide element, the release element can be mounted so as to be tiltable relative to the guide element. The release element can thus be designed like a rocker. If the conductor to be connected is pressed against the release element, the release element can tilt in the insertion direction of the conductor in order to come out of engagement with the guide element and thus release the guide element so that it is again freely displaceable.

In order to be able to form an engagement of the release element with the guide element in the release position of the clamping leg of the clamping spring, the release element can have at least one undercut with which at least one latching lug of the guide element can latch when the clamping leg of the clamping spring is in the release position. As a result, a latching connection can be formed between the guide element and the release element when the clamping leg of the clamping spring is in the release position. The release element preferably has two undercuts and the guide element preferably has two latching lugs, so that a double-acting latching can be created between the guide element and the release element. If two undercuts are provided, they will preferably be formed on two side faces of the release element running parallel to each other. The release element can then have a T-shape due to the two undercuts.

It can preferably also be provided that the guide element has two longitudinal side walls arranged parallel to each other, which can delimit the conductor connection space on a first side and on a second side opposite the first side. The guide element can thus also form a guide for the conductor to be connected when it is being inserted into the conductor connection space. The two longitudinal side walls can prevent incorrect insertion of the conductor. The conductor connection space can thus be delimited on two of its sides by the guide element and on its other two sides by the busbar and by the clamping leg of the clamping spring.

The guide element can have a slide face along which the actuating element can be guided. At the slide face the actuating element can rest flat against the guide element. The actuating element can slide along the guide element via the slide face and thus apply a compressive force to the guide element.

The slide face can be arranged between the two longitudinal side walls of the guide element or on an end wall of the guide element. The slide face is preferably oriented such that the slide face extends transversely to the two longitudinal side walls. By arranging the slide face between the two longitudinal side walls, in order to actuate the guide element, the actuating element can be inserted into the free space delimited by the two longitudinal side walls and the slide face, wherein the two longitudinal side walls can form a guidance aid for the actuating element in order to be able to prevent tilting of the actuating element as it is being guided along the slide face of the guide element.

The slide face can form an inclined surface which can interact with an inclined surface formed on the actuating element. If the slide face is designed as an inclined surface, it will preferably have an inclination. The surface of the actuating element resting against the slide face will then also preferably be designed as an inclined surface which is formed inclined with respect to the longitudinal extension of the actuating element which extends in the direction of movement of the actuating element. If both the slide face and the surface of the actuating element which slides along the slide face are designed as an inclined surface, it will be possible for the perpendicular movement direction of the actuating element to be converted into a horizontal displacement movement of the guide element when the actuating element slides along the slide face.

The actuating element preferably has a latching region via which the actuating element can be held in a fixed position on the guide element in the release position of the clamping spring. By the actuating element being held in the fixed and thus latched position on the guide element, an undesired return displacement of the actuating element can be prevented. The actuating element is preferably released from the fixed position with the guide element when a conductor to be connected actuates the release element and thereby the clamping spring is transferred from the release position into the clamping position. In the clamping position of the clamping spring, the latching region of the actuating element is preferably released by the guide element, so that the actuating element can be moved away from the guide element in such a way that the display element of the actuating element can indicate the clamped state of the conductor. The latching region is preferably formed on an end section of the actuating element which is spaced apart from the end section on which the display element is formed.

The latching region can, for example, be designed in such a way that, in the release position of the clamping spring, it can surround the slide face of the guide element at least in regions. For this purpose, the latching region can have two guide arms which can engage behind the slide face at least in regions and thus can hook behind at the slide face.

In addition, it can also be possible for the latching region to have one or two holding pins, which can each hook into a recess formed on the guide element. On the two longitudinal side walls of the guide element, in each case one of the recesses can then be formed.

In order to be able to support the displacement movement of the guide element, the guide element can be connected to a spring element. The spring element preferably takes the form of a compression spring. The spring element preferably stretches between the guide element and an inner side of the housing. The spring element can apply a horizontally acting compressive force to the guide element in order to support the displacement movement of the guide element during a movement of the clamping spring from the release position into the clamping position. The spring element makes it possible for the guide element in the clamping position of the clamping spring always to be moved or pressed into its end position, irrespective of the diameter of the conductor to be connected.

The object according to the invention can also be achieved by means of an electronic device which can have at least one connection arrangement formed and further developed as described above.

FIGS. 1 to 6 show a connection arrangement 100 with a housing 132, which can be formed from an insulating material, wherein a conductor insertion opening 133 for inserting and connecting an electrical conductor 200 is formed in the housing 132.

Figure 2:
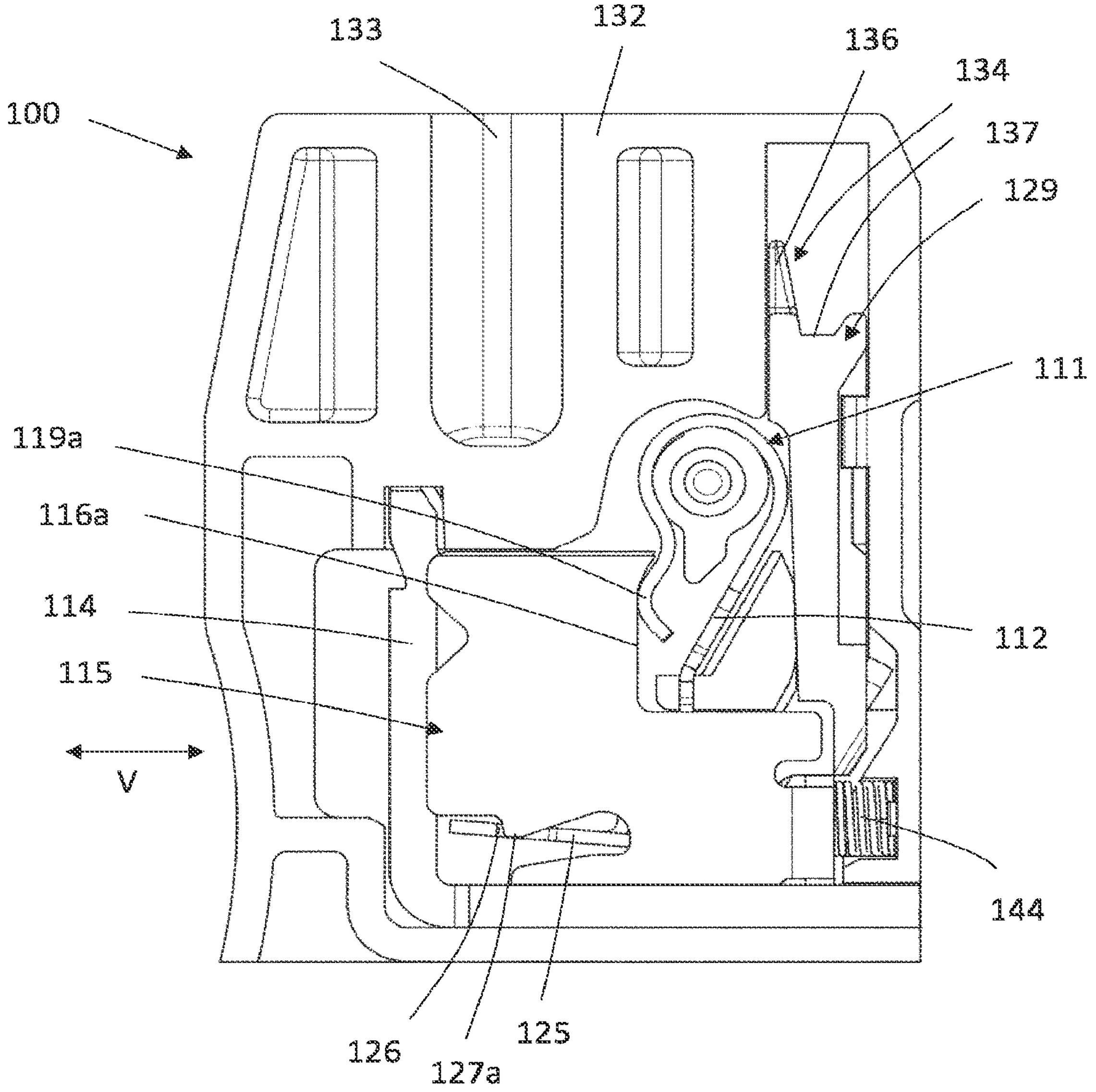
FIG. 2 is a schematic representation of the connection arrangement shown in FIG. 1 with the clamping leg of the clamping spring in a release position in another view.
Figure 3:
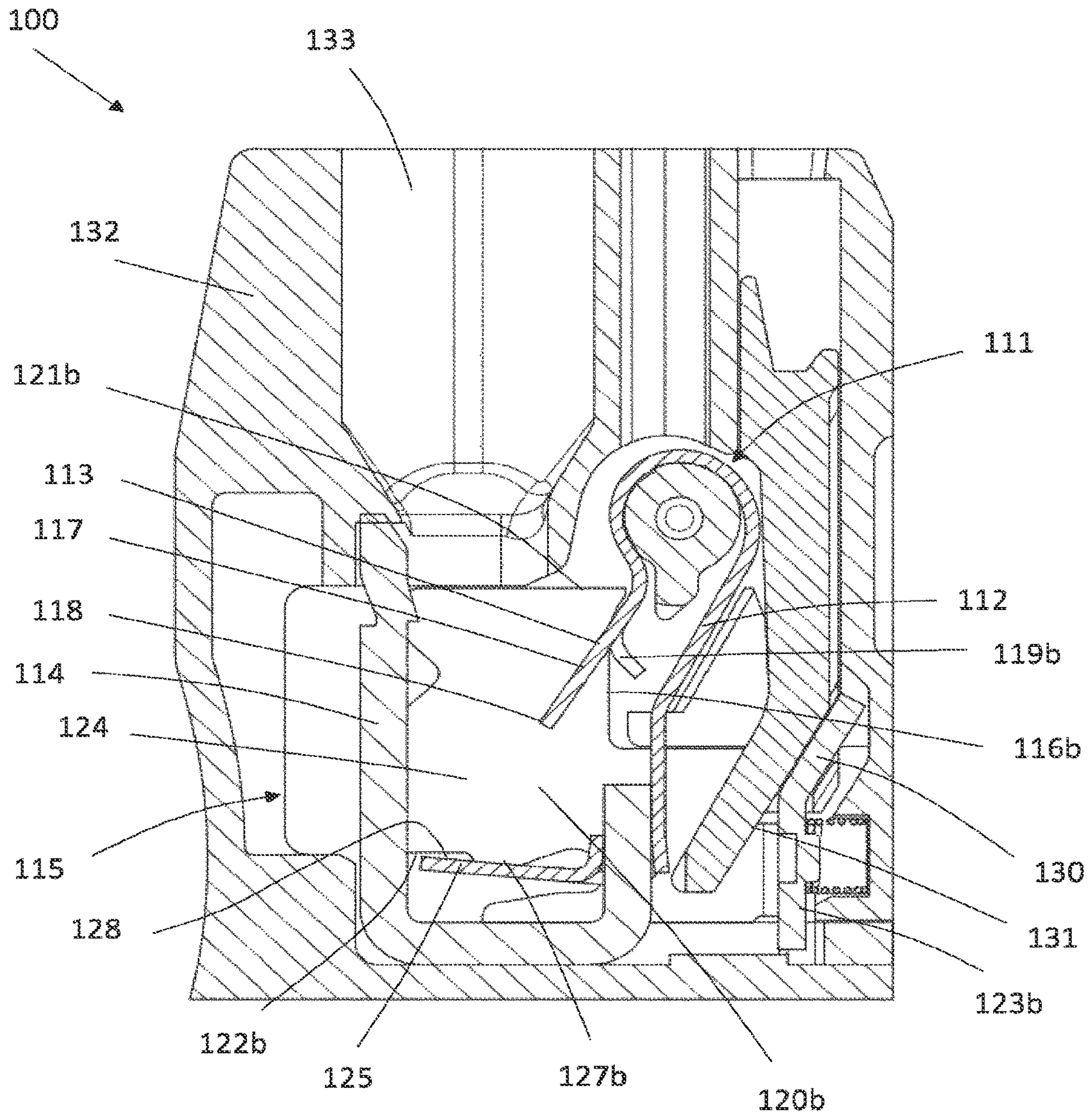
FIG. 3 is a schematic sectional representation of the connection arrangement shown in FIG. 2.
Figure 4:
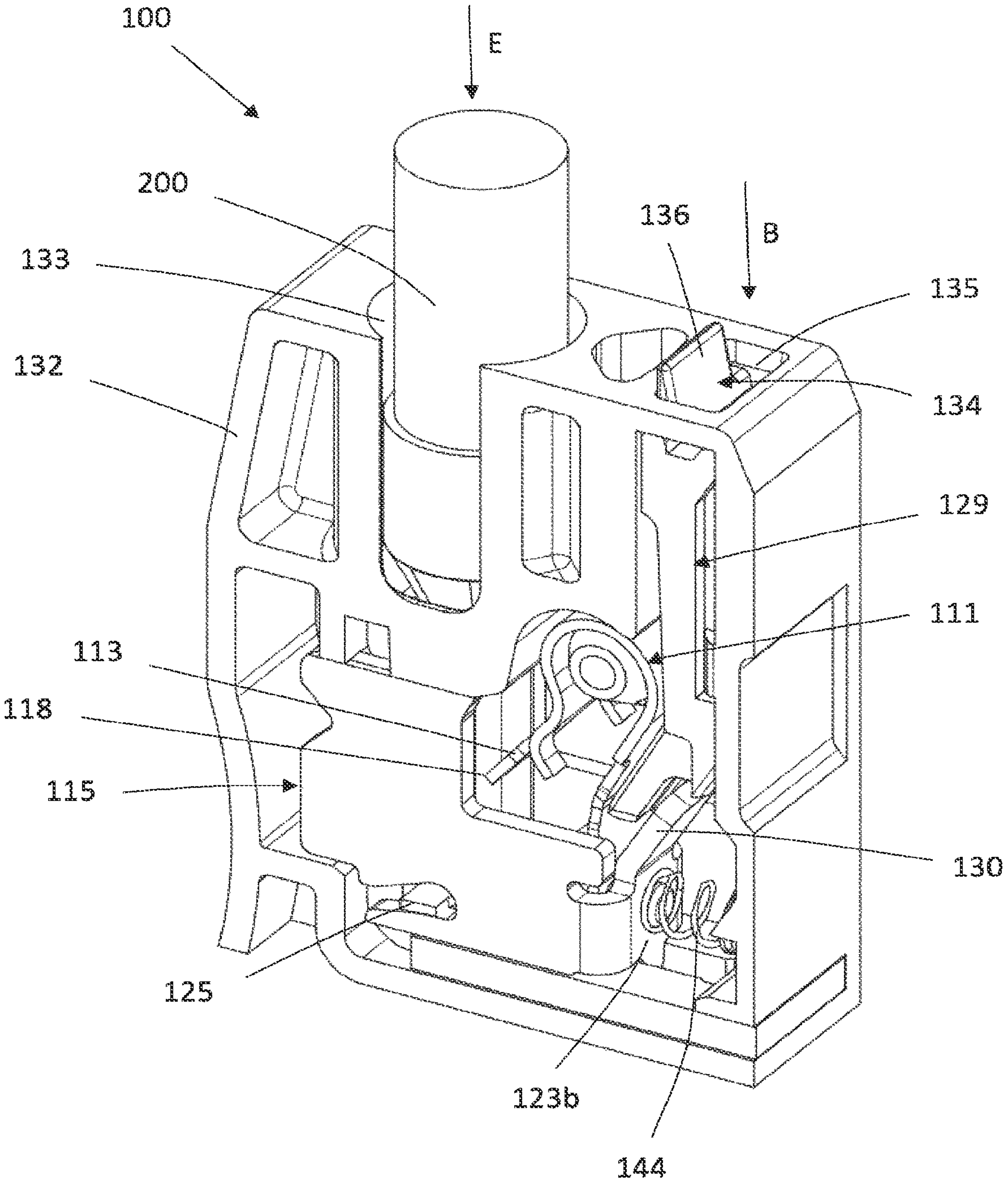
FIG. 4 is a schematic representation of the connection arrangement shown in FIGS. 1 and 2 according to the invention with the clamping leg of the clamping spring in a clamping position and with a connected conductor.
Figure 5:
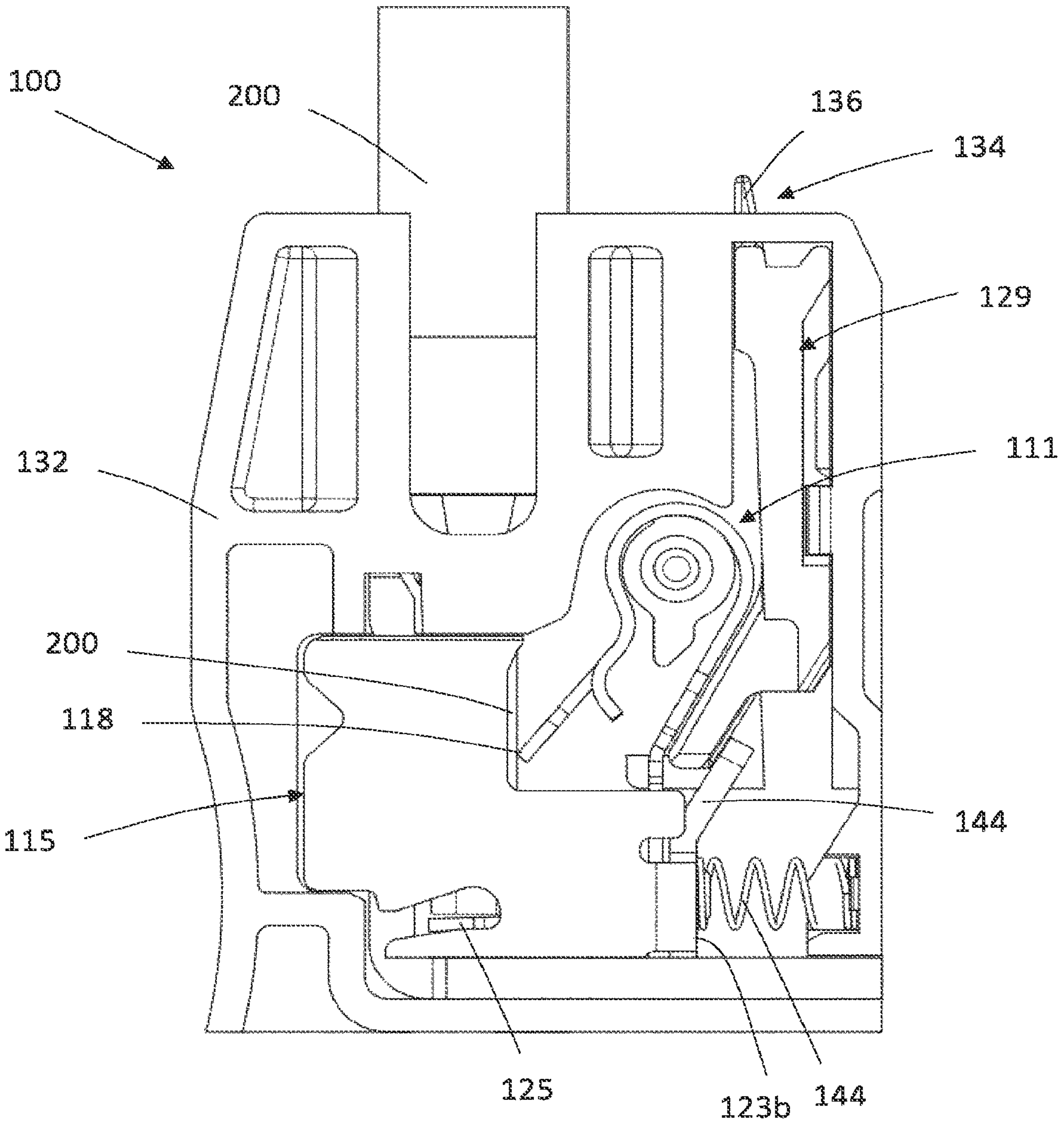
FIG. 5 is a schematic representation of the connection arrangement shown in FIG. 4 in another view with the clamping leg of the clamping spring in a clamping position and with a connected conductor.
Figure 6:
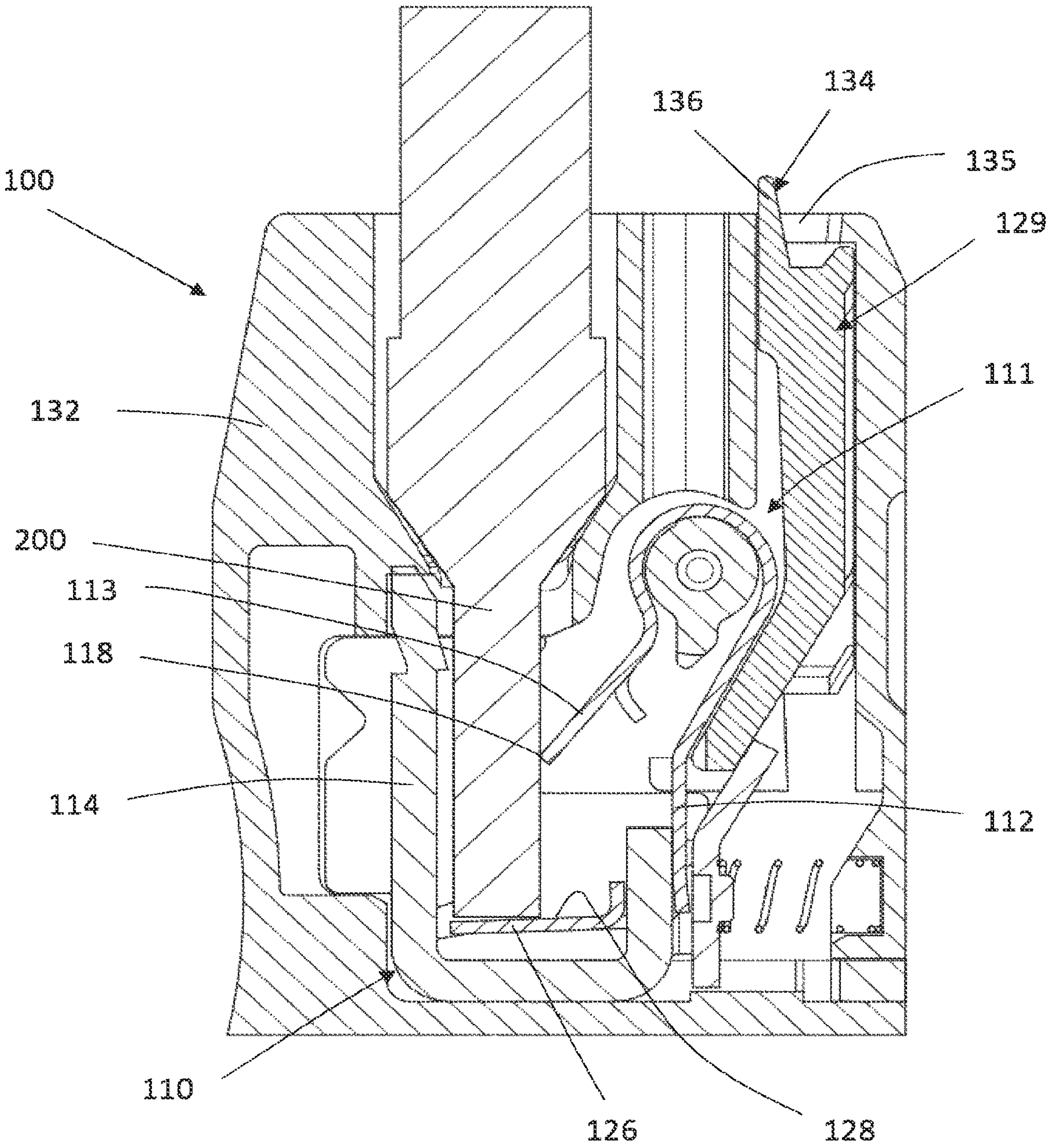
FIG. 6 is a schematic sectional representation of the connection arrangement shown in FIG. 5.

The connection arrangement 100 has a busbar 110 and a clamping spring 111 designed as a leg spring, as can be seen in particular also in the sectional view in FIG. 3. The clamping spring 111 has a retaining leg 112 and a clamping leg 113. The retaining leg 112 is held in a fixed position, whereas the clamping leg 113 is pivotable relative to the retaining leg 112. By a pivoting movement of the clamping leg 113, it can be transferred into a clamping position, as shown in FIGS. 4 to 6, and into a release position, as shown in FIGS. 1 to 3. In the clamping position, the clamping leg 113 presses against a section 114 of the busbar 110 or against a conductor 200 inserted into the connection arrangement 100 in order to clamp said conductor against the section 114 of the busbar 110 and connect the same. In the release position, the clamping leg 113 is positioned at a distance from the section 114 of the busbar 110, so that a conductor 200 can be inserted into the thus formed free space or conductor connection space 124 between the section 114 of the busbar 110 and the clamping leg 113.

The connection arrangement 100 also has a guide element 115. The guide element 115 is mounted displaceably in particular with respect to the busbar 110, so that the guide element 115 can perform a horizontal displacement movement V.

By means of the guide element 115, the clamping leg 113 of the clamping spring 111 can be transferred from the clamping position into the release position and held in the release position. For this purpose, the guide element 115 is operatively connected to the clamping leg 113 of the clamping spring 111.

In order to form the operative connection, in the embodiment shown here, the guide element 115 has two spring contact edges 116*a*, 116*b* arranged parallel to each other, against which the clamping leg 113 rests.

The clamping leg 113 has a main section 117, on the free end of which a clamping edge 118 is formed. Two slide sections 119*a*, 119*b* are formed on the sides of the main section 117, so that the main section 117 is arranged between the two slide sections 119*a*, 119*b*. The two slide sections 119*a*, 119*b* rest on the two spring contact edges 116*a*, 116*b* of the guide element 115, wherein the slide section 119*a* rests against the spring contact edge 116*a* and the slide section 119*b* rests against the spring contact edge 116*b*. The slide sections 119*a*, 119*b* can rest on the spring contact edges 116*a*, 116*b* not only in the release position but also in the clamping position of the clamping leg 113 of the clamping spring 111.

The slide sections 119*a*, 119*b* have a shorter length than the main section 117 of the clamping leg 113 of the clamping spring 111. The slide sections 119*a*, 119*b* are curved so that they form a skid shape, by means of which the slide sections 119*a*, 119*b* can slide along the spring contact edges 116*a*, 116*b* when the clamping leg 113 is being transferred into the release position and into the clamping position.

The two spring contact edges 116*a*, 116*b* are formed on opposite longitudinal side walls 120*a*, 120*b* of the guide element 115. The two longitudinal side walls 120*a*, 120*b* are arranged parallel to each other. The two longitudinal side walls 120*a*, 120*b* in each case have an upper edge 121*a*, 121*b* and an opposite lower edge 122*a*, 122*b*. The spring contact edges 116*a*, 116*b* in each case extend perpendicular to the upper edge 121*a*, 121*b*. Starting from the horizontally extending upper edge 121*a*, 121*b*, the spring contact edges 116*a*, 116*b* extend downwardly in the direction of the horizontally extending lower edge 122*a*, 122*b* of the guide element 115.

The busbar 110 and the clamping spring 111 are arranged between the two longitudinal side walls 120*a*, 120*b* of the guide element 115. The busbar 110 and the clamping spring 111 are enclosed by the guide element 115.

The guide element 115 also has two end walls 123*a*, 123*b* which are aligned parallel to each other. The two end walls 123*a*, 123*b* are arranged transversely to the two longitudinal side walls 120*a*, 120*b* of the guide element 115.

The conductor connection space 124, into which a conductor to be connected can be inserted, is formed between the section 114 of the busbar 110 and the clamping leg 113 of the clamping spring 111. The conductor connection space 124 is covered or delimited laterally by the two longitudinal side walls 120*a*, 120*b* of the guide element 115, so that the guide element 115 also forms a guide for the conductor 200 to be connected.

The conductor connection space 124 is designed to align with the conductor insertion opening 133 formed in the housing 132, via which the conductor 200 to be connected can be inserted into the housing 132 of the connection arrangement 100.

The connection arrangement 100 also has a release element 125. The release element 125 is arranged in alignment with the conductor insertion opening 133 and the conductor connection space 124. The release element 125 delimits the conductor connection space 124 downwards.

In the release position of the clamping leg 113 of the clamping spring 111, the release element 125 is in engagement with the guide element 115, as can be seen in FIGS. 1 to 3, as a result of which the guide element 115 is held in its position and as a result the clamping leg 113 is also held in its position via the spring contact edges 116*a*, 116*b* and the slide sections 119*a*, 119*b*, so that an undesired pivoting back of the clamping leg 113 from the release position into the clamping position can be prevented.

The release element 125 has two laterally arranged undercuts 126 which, in the release position of the clamping leg 113 of the clamping spring 111, are in engagement in each case with a latching lug 127*a*, 127*b* of the guide element 115 in order to form a latching between the guide element 115 and the release element 125. The latching lug 127*a* is formed on the lower edge 122*a* of the longitudinal side wall 120*a* and the latching lug 127*b* is formed on the lower edge 122*b* of the longitudinal side wall 120*b*.

In the clamping position, the release element 125 is out of engagement with the guide element 115, as can be seen in FIGS. 4 to 6, so that the guide element 115 is freely displaceable.

The release element 125 is mounted so as to be tiltable relative to the guide element 115.

When a conductor 200 to be connected is inserted along the insertion direction E via the conductor insertion opening 133 and into the conductor connection space 124, the conductor 200 rests against the release element 125, as a result of which the release element 125 is tilted relative to the guide element 115 and thereby comes out of engagement with the guide element 115, so that the guide element 115 can be freely displaced again, and the guide element 115 can thereby be displaced by the spring force of the clamping leg 113 alone without manual assistance in such a way that the clamping leg 113 can be transferred from the release position into the clamping position. The release element 125 has a pressure surface 128 which faces in the direction of the conductor connection space 124, as can be seen in FIG. 6, and is arranged aligned with the conductor insertion opening 133 or aligned with the conductor connection space 124, so that the conductor 200 rests against the pressure surface 128 of the release element 125 when it is being inserted into the connection arrangement 100, as a result of which a compressive force is applied by the conductor 200 to the release element 125. By applying a compressive force to the pressure surface 128 by means of the conductor 200 and thus to the release element 125, the release element 125 can be brought into a pivoting movement or tilting movement in the direction of the insertion direction E of the conductor 200 so that the release element 125 can be pivoted or tilted away from the guide element 115 in the insertion direction E of the conductor 200.

The displacement movement V of the guide element 115, when this is out of engagement with the release element 125, takes place in a direction which is oriented transversely to the insertion direction E of the conductor 200 to be connected into the conductor connection space 124.

In order to transfer the clamping leg 113 back from the clamping position into the release position against its spring force by means of the guide element 115, the connection arrangement 100 has an actuating element 129. The actuating element 129 is mounted displaceably along an actuating direction B in the housing 132, wherein the actuating direction B is oriented parallel to the insertion direction E of the conductor 200. The actuating direction B extends transversely to the displacement movement V of the guide element 115.

By means of the actuating element 129, the guide element 115 can be displaced in such a way that the clamping leg 113 of the clamping spring 111 resting against the guide element 115 can be transferred from the clamping position into the release position. When the actuating element 129 is actuated in the actuating direction B, the actuating element 129 can be displaced in such a way that it exerts a compressive force on the guide element 115 in order to displace the guide element 115 against the spring force of the clamping leg 113 of the clamping spring 115 in such a way that, when the release position of the clamping leg 113 is reached, the guide element 115 can engage with the release element 125. This displacement movement V of the guide element 115 causes the clamping leg 113 to pivot from the clamping position into the release position.

The guide element 115 has a slide face 130 designed in the form of an inclined surface, as can be seen, for example, in FIG. 3, along which the actuating element 129 can be guided. In the embodiment shown here, the slide face 130 is formed on the end wall 123*b* of the guide element 115. The slide face 130 extends, starting from the end wall 123*b*, in the direction of the actuating element 129. By its formation as an inclined surface the slide face 130 is arranged inclined, so that the slide face 130 extends here at an angle between 130° and 160° to the end wall 123*b* of the guide element 115.

Alternatively, it would also be possible for the slide face 130 to be arranged at a distance from the end wall 123*b* between the two longitudinal side walls 120*a*, 120*b* so that the slide face 130 is directly connected to the longitudinal side walls 120*a*, 120*b*.

The actuating element 129 also has an inclined surface 131 formed corresponding to the inclination of the slide face 130. The inclined surface 131 of the actuating element 129 rests flat against the slide face 130, so that when the actuating element 129 is actuated in the actuating direction B, the inclined surface 131 can slide downwards along the slide face 130 in order to displace the guide element 115.

The actuating element 129 is arranged adjacent to the retaining leg 112 of the clamping spring 111. The actuating element 129 is thus arranged behind the clamping spring 111. The clamping spring 111 is arranged between the section 114 of the busbar 110 and the actuating element 129.

A display element 134 for displaying a connection state of the electrical conductor 200 to be connected is formed on the actuating element 129 on an end section of the actuating element 129 opposite the inclined surface 131. The display element 134 is thus formed at a free end of the actuating element 129. The display element 134 is oriented such that it points away from the guide element 115.

As can be seen in FIGS. 3 to 6, in the release position of the clamping spring 111, the actuating element 129 penetrates into the housing 132 so far that the display element 134 is inside the housing 132 and therefore not visible from the outside for a user.

When the clamping spring 111 is transferred from the release position into the clamping position, the actuating element 129 is displaced upwards, wherein when the clamping position is reached, the actuating element 129 is displaced upwards to such an extent that the display element 134 projects from an opening 135 of the housing 132 and is thus visible to a user, as can be seen in particular in FIGS. 1 to 3. The user can tell that the conductor 200 is connected by the display element 134 projecting from the opening 135. The opening 135 is arranged on the same side of the housing 132 as the conductor insertion opening 133.

In the embodiment shown here, the display element 134 is designed in the form of a wedge-shaped extension 136 on the end section of the actuating element 129. In the clamping position of the clamping spring 111, the display element 134 projects from the opening 135 of the housing 132 with at least a partial section of the wedge-shaped extension 136, so that this part of the wedge-shaped extension 136 or of the display element 134 projects beyond the housing 132. The wedge-shaped extension 136 has a smaller width and/or a smaller depth or thickness than the rest of the actuating element 129.

The actuating element 129 has a tool receiving region 137 on the end section, on which the display element 134 is also formed, in which a tool, such as a screwdriver, can be inserted in order to actuate the actuating element 129. The tool receiving region 137 takes the form of a groove or a slot. The display element 134 is arranged directly adjacent to the tool receiving region 137. The display element 134 can thereby form an insertion aid for the insertion of a tool into the tool receiving region 137 and also serve as a support aid for the inserted tool when the actuating element 129 is being actuated.

Figure 7:
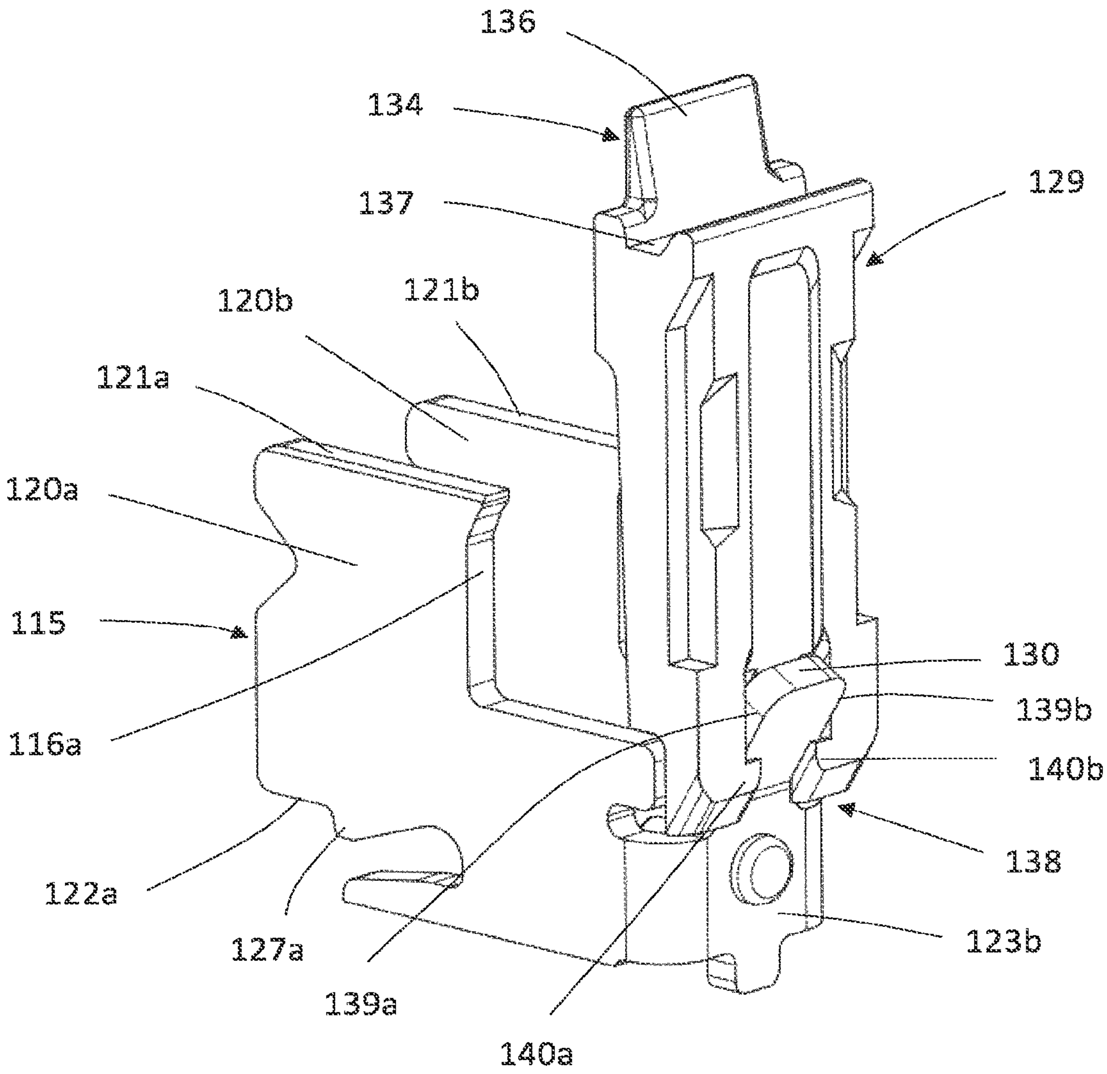
FIG. 7 is a schematic view of the actuating element shown in FIGS. 1 to 6, arranged on the guide element shown in FIGS. 1 to 6.

In order to be able to hold the actuating element 129 in the release position of the clamping spring 111 in a fixed position on the guide element 115, so that in particular the display element 134 also remains penetrating the housing 132 and does not project from the opening 135, the actuating element 129 has a latching region 138, as can be seen in particular in FIG. 7. The latching region 138 makes it possible for the actuating element 129 to latch on or hook behind the guide element 115 in order to be able to hold the actuating element 129 in a fixed position relative to the guide element 115.

In the embodiment shown in FIG. 7, the latching region 138 is designed such that, in the release position of the clamping spring 111, it surrounds the slide face 130 of the guide element 115 at least in regions. For this purpose, the latching region 138 has two guide arms 140*a*, 140*b* which at least in regions engage around two opposite edge surfaces 139*a*, 139*b* of the slide face 130 in the release position of the clamping spring 111. The guide arms 140*a*, 140*b* are arranged opposite the inclined surface 131 of the actuating element 129 so that a free space is formed between the inclined surface 131 and the guide arms 140*a*, 140*b*, in which free space the slide face 130 of the guide element 115 is immersed in the release position of the clamping spring 111.

If the release element 125, due to the insertion of a conductor 200, is actuated by the latter and the latching between the release element 125 and the guide element 115 is released, the latching between the latching region 138 and the guide element 115 will also be released by the guide element 115 being moved away from the actuating element 129 along the direction of the displacement movement V. In the clamping position of the clamping spring 111, the latching region 138 is out of engagement with the guide element 115.

Figure 8:
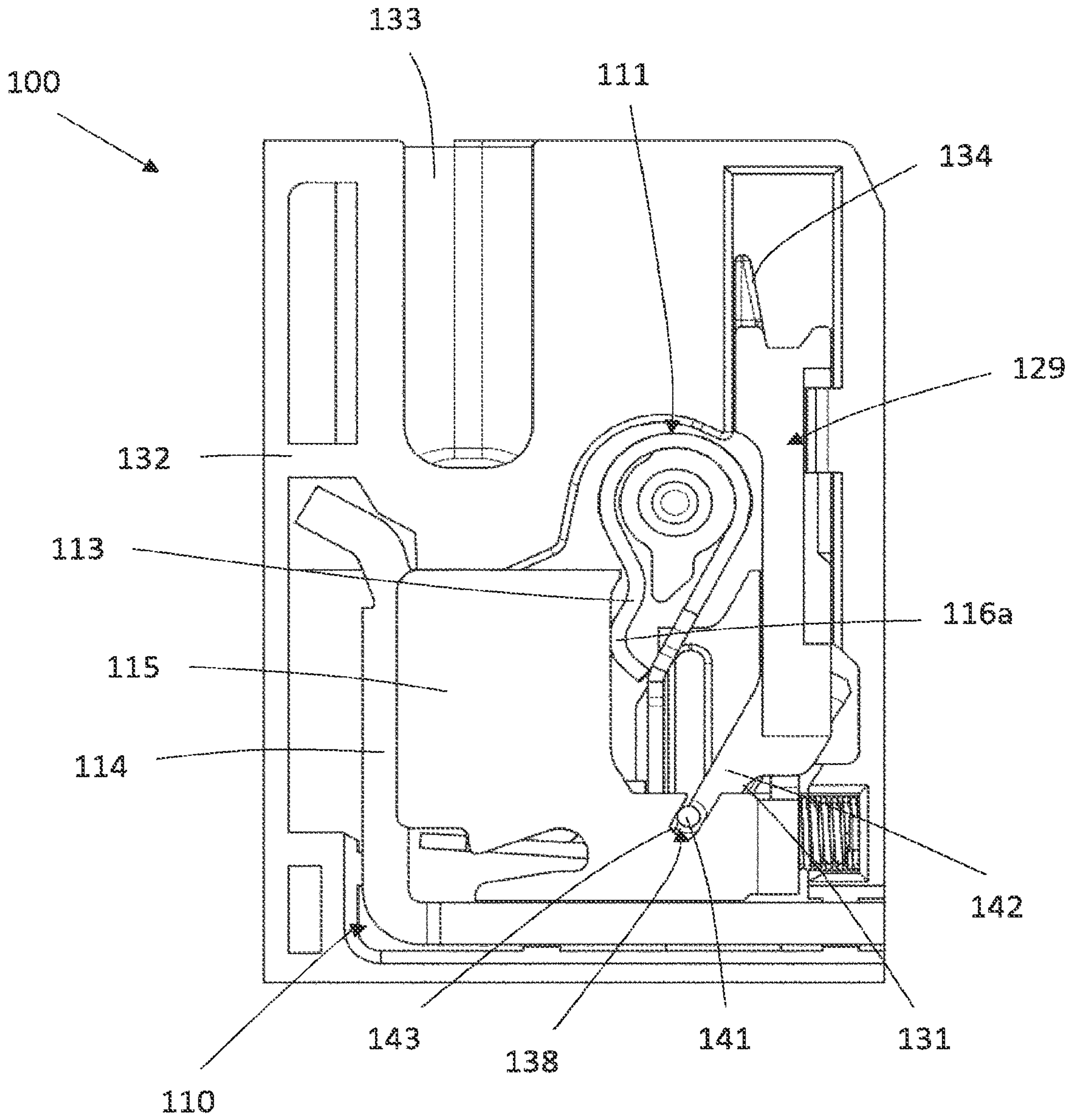
FIG. 8 is a further schematic representation of a connection arrangement according to the invention with the clamping leg of the clamping spring in a release position.
Figure 9:
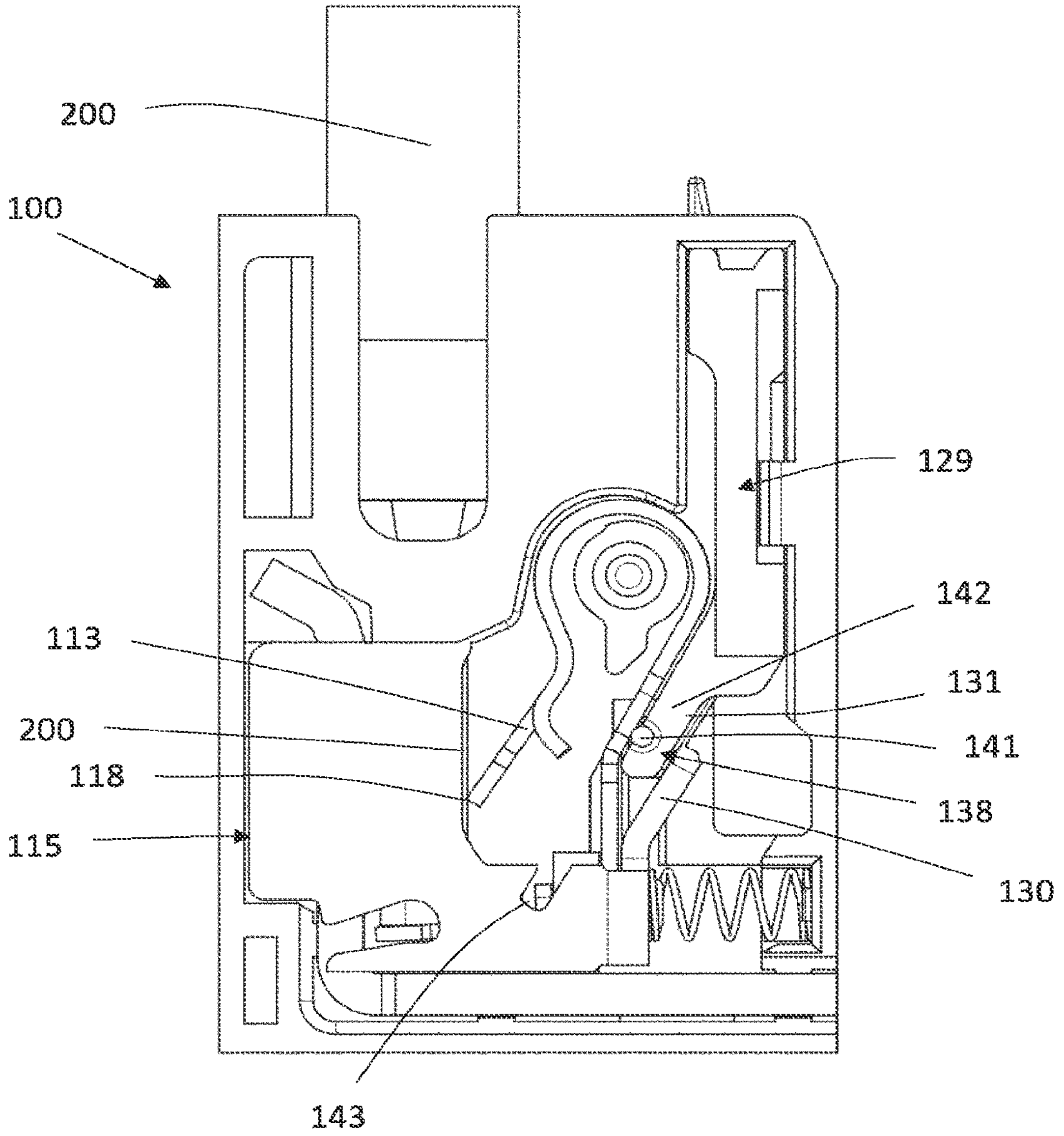
FIG. 9 is a schematic representation of the connection arrangement shown in FIG. 8 with the clamping leg of the clamping spring in a clamping position and with a connected conductor.

FIGS. 8 and 9 show an embodiment in which the latching region 138 is designed in the form of two opposing holding pins 141, which can each latch on the guide element 115. The holding pins 141 are each arranged on an edge surface 142 of the inclined surface 131, so that the holding pins 141 protrude laterally from the inclined surface 131 or from one of the two edge surfaces 142 of the inclined surface 131.

A recess 143 is formed on each of the two longitudinal side walls 120*a*, 120*b* of the guide element 115, into which in each case one of the two holding pins 141 can hook or latch in the release position in order to latch the actuating element 129 to the guide element 115 and to thus hold the actuating element 129 in a fixed position relative to the guide element 115. One of the two holding pins 141 will then penetrate the recess 143 of the longitudinal side wall 120*a* and the other of the two holding pins will simultaneously penetrate the recess 143 of the longitudinal side wall 120*b*, as shown in FIG. 8. FIG. 9 shows the clamping position of the clamping spring 111, in which the holding pins 141 have been brought out of the recess 143 and thus latching is no longer created between the guide element 115 and the actuating element 129.

In both embodiments shown in FIGS. 1 to 9, a spring element 144 is provided for supporting the displacement movement V of the guide element 115. The spring element 144 is held tensioned between the guide element 115 and the housing 132.

The spring element 144 takes the form of a compression spring. The spring element 144 has the shape of a spiral spring. In the release position of the clamping spring 111, the spring element 144 is tensioned. When the guide element 115 is released from latching with the release element 125, the spring element 144 presses against the guide element 115, wherein the force of the spring element 144 acts in the direction of the displacement movement V of the spring element 144, so that by the compressive force of the spring element 144 the guide element 115 in the clamping position of the clamping spring 111 is pressed or pushed up to its end position and thus in the embodiments shown in FIGS. 1 to 9 as far as possible to the left. The spring element 144 rests against the end wall 123*b* of the guide element 115. For example, the spring element 144 can be connected to the guide element 115 via a riveted connection.

Figure 10:
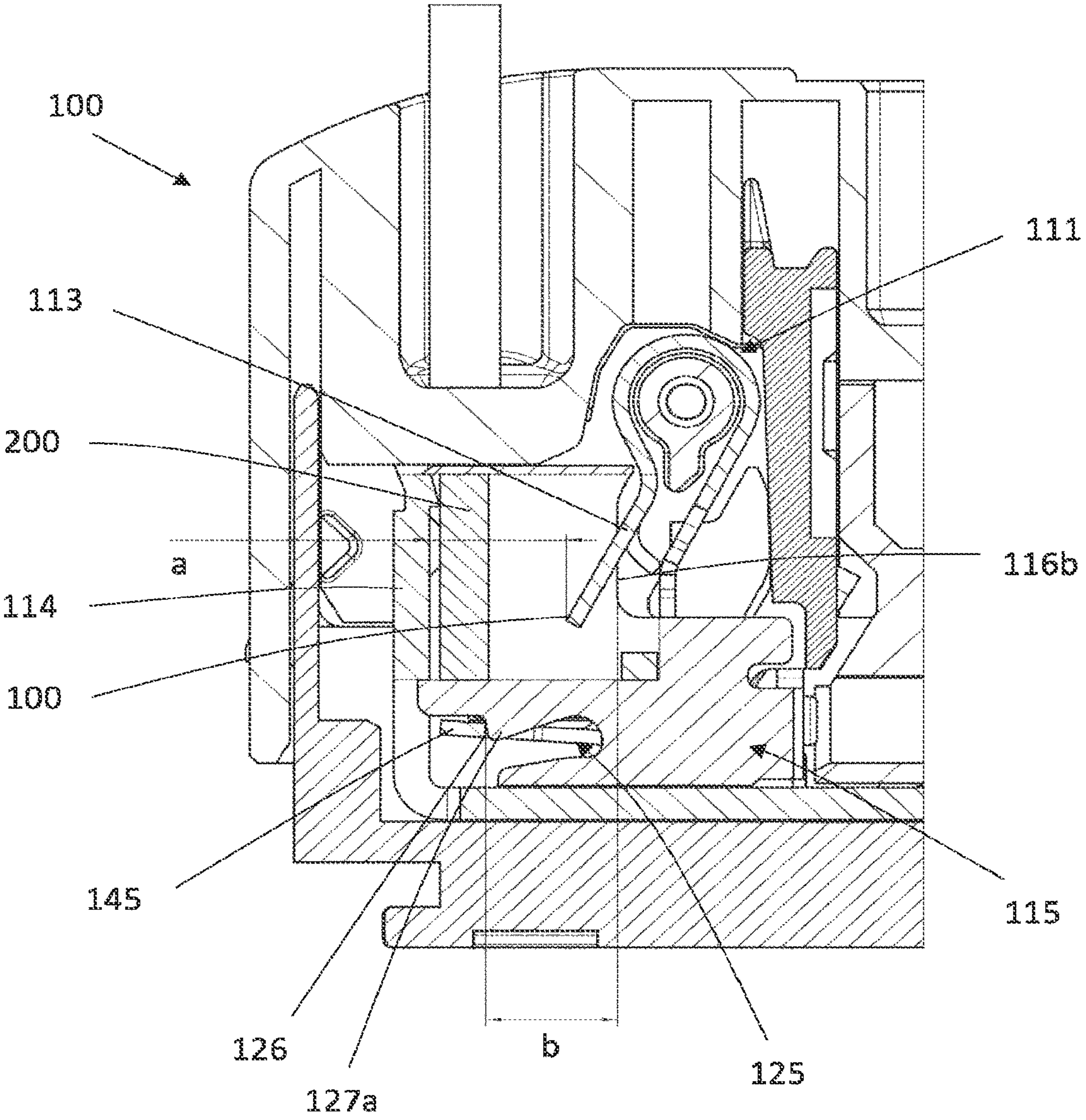
FIG. 10 is a schematic representation of the connection arrangement according to the invention with the arrangement of the latching lugs of the guide element in a first position.
Figure 11:
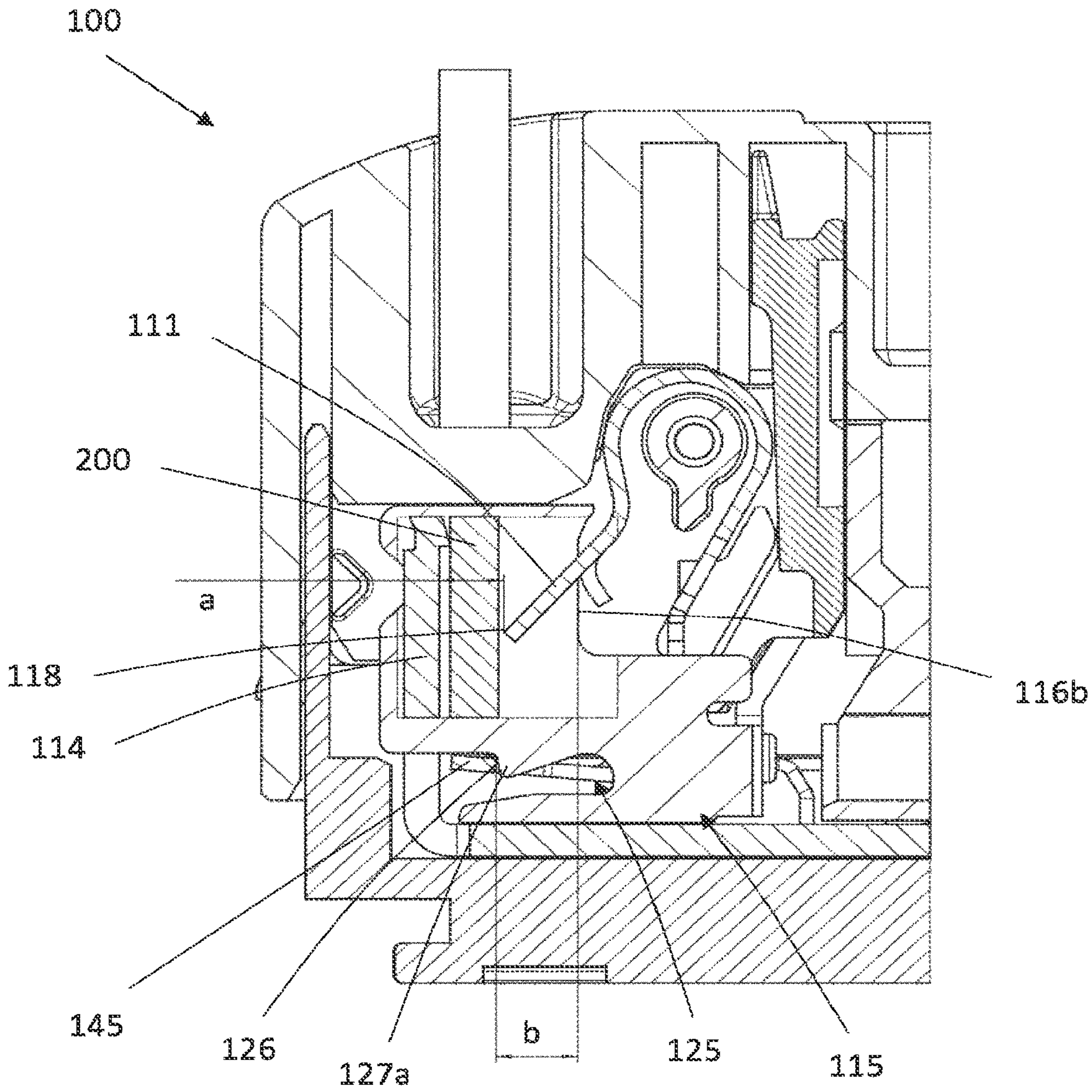
FIG. 11 is a schematic representation of the connection arrangement according to the invention with the arrangement of the latching lugs of the guide element in a second position.

FIGS. 10 and 11 show that by changing the position of the latching lugs 127*a*, 127*b* on the guide element 115 a position ratio of the clamping spring 111 in relation to the guide element 115 can be set. For a positionally accurate feeding of the conductor 200 in the direction of the release element 125, an optimized a/b ratio can be set, wherein the dimension a defines the distance between the clamping edge 118 of the clamping leg 113 and the section 114 of the busbar 110 and the dimension b defines the distance between the spring contact edge 116*a*, 116*b* of the guide element 115 and the latching lug 127*a*, 127*b* of the guide element 115. FIG. 11 shows a maximum a/b ratio=1.5 mm/1.9 mm. FIG. 10 shows a minimum a/b ratio=3.0 mm/3.0 mm.

By means of this selectively adjustable position ratio via the a/b ratio, the release forces required by the conductor 200 for actuating the release element 125 can be reduced, since, depending on the thickness of the conductor 200, the clamping edge 118 of the clamping spring 111 can be positioned in the release position in such a way that the clamping edge 118 can guide the conductor 200 in a targeted manner in the direction of the release element 125. This is particularly advantageous in the case of flexible conductors 200.

The latching lugs 127*a*, 127*b* can be positioned via the specifically selected a/b ratio such that they can cause the clamping leg 113 of the clamping spring 111 to advance into a specific, angled position in order, in particular, to direct flexible conductors 200 onto the free end 145 of the release element 125, whereby the resulting lever forces can be directed onto the release element 125 as far away as possible from the axis of rotation of the release element 125. Individual strands of flexible conductors 200 with a larger diameter can be compressed by the clamping leg 113 which is angled in this way and can be guided in the direction of the section 114 of the busbar 110.

When rigid conductors 200 are used, the angled clamping leg 113 can be pressed against the spring force of the clamping leg 113 in the direction of the retaining leg 112 corresponding to a direct plugging-in operation.

Figure 12:
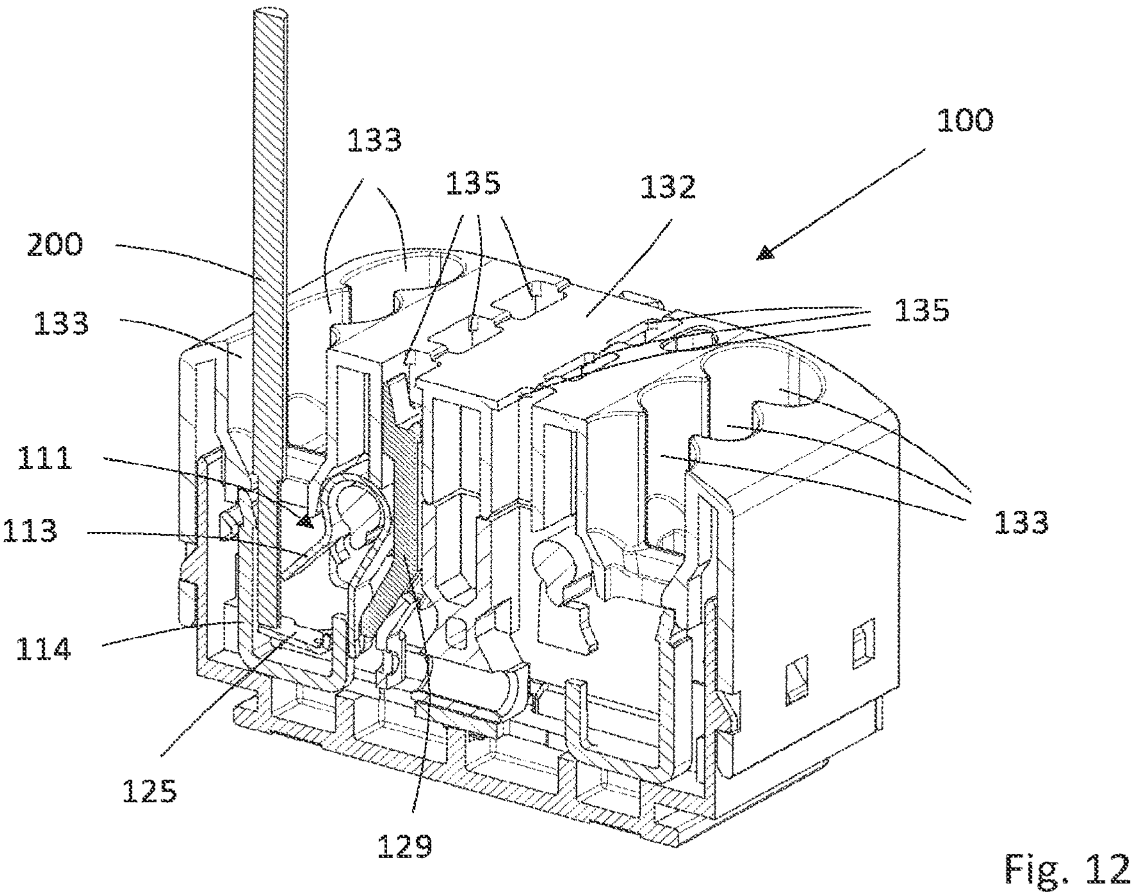
FIG. 12 is a schematic sectional representation of a connection arrangement according to the invention in the form of a clamp terminal.
Figure 13:
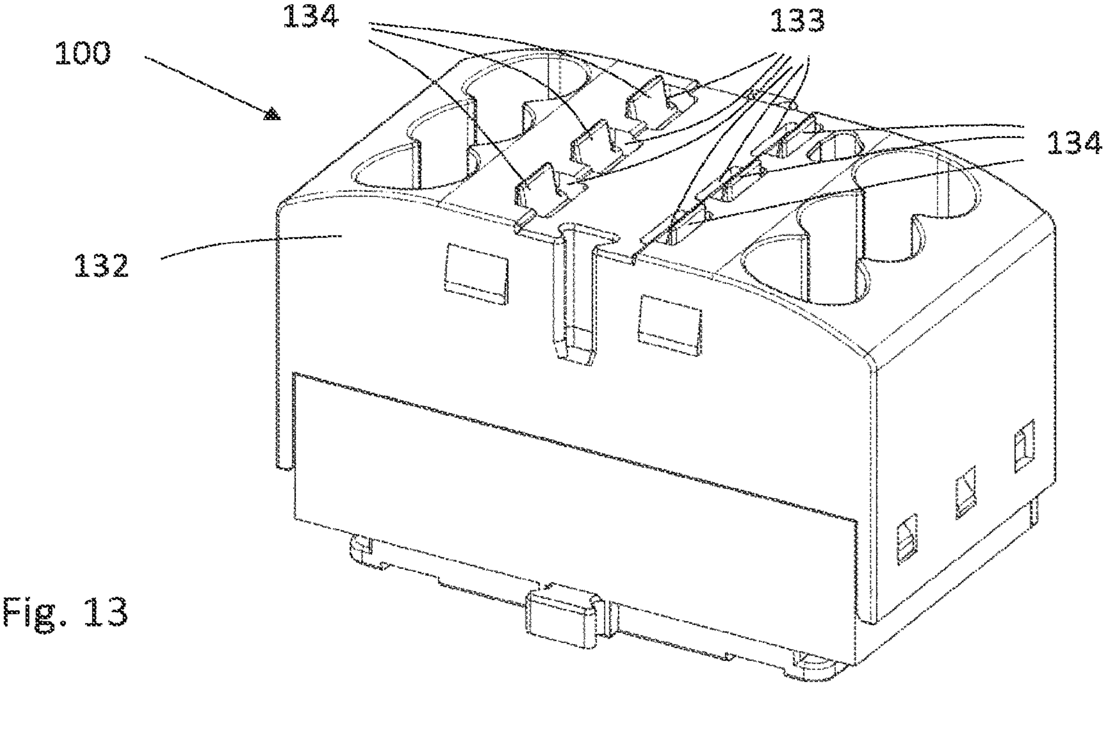
FIG. 13 is a further schematic representation of the connection arrangement shown in FIG. 12.

FIGS. 12 and 13 show an embodiment in which the connection arrangement 100 is designed in the form of a clamp terminal, in particular a terminal block, wherein the connection arrangement 100 is designed such that a plurality of conductors 200 can be connected simultaneously in a housing 132 in that a plurality of connection points are provided in the housing 132, which connection points can each be designed in accordance with the embodiments shown in FIGS. 1 to 9.

FIG. 12 shows how just one conductor 200 is being inserted into the housing 132, but the conductor 200 has not yet actuated the release element 125 and thus the clamping spring is still in a release position, so that the display element 134 of the actuating element 129 is still arranged inside the housing 132 and is not yet visible from the outside for a user.

FIG. 13 shows an arrangement in which the display elements 134 of the individual actuating elements 129 project from the openings 135 of the housing 132, so that it is indicated to the user that the clamping springs 111 are in a clamping position.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A,

LIST OF REFERENCE SIGNS

100 Connection arrangement
110 Busbar
111 Clamping spring
112 Retaining leg
113 Clamping leg
114 Section of the busbar
115 Guide element
116*a*, 116*b* Spring contact edge
117 Main section
118 Clamping edge
119*a*, 119*b* Slide section
120*a*, 120*b* Longitudinal side wall
121*a*, 121*b* Upper edge
122*a*, 122*b* Lower edge
123*a*, 123*b* End wall
124 Conductor connection space
125 Release element
126 Undercut
127*a*, 127*b* Latching lug
128 Pressure surface
129 Actuating element
130 Slide face
131 Inclined surface
132 Housing
133 Conductor insertion opening
134 Display element
135 Opening
136 Wedge-shaped extension 137 Tool receiving region
138 Latching region
139*a*, 139*b* Edge surface
140*a*, 140*b* Guide arm
141 Holding pin
142 Edge surface
143 Recess
144 Spring element
145 Free end
200 Conductor
V Displacement movement
E Insertion direction
B Actuating direction

The invention claimed is:

1. A connection arrangement for connecting an electrical conductor, comprising:

a housing;

a busbar;

a clamping spring comprising a clamping leg transferrable into a clamping position and into a release position;

a conductor connection space formed between a section of the busbar and the clamping leg of the clamping spring;

a displaceably arranged guide element, which is in operative connection with the clamping leg of the clamping spring, the clamping leg being holdable in the release position by the guide element;

a release element, which, in the release position of the clamping leg of the clamping spring, is in engagement with the guide element, the release element during insertion of the conductor to be connected into the conductor connection space being actuatable thereby such that the release element comes out of engagement with the guide element and the guide element is displaceable in a direction of a displacement movement of the guide element by a spring force of the clamping leg such that the clamping leg is transferred into the clamping position in order to clamp the conductor against the busbar; and an actuating element, by which the guide element is displaceable in order to transfer the clamping leg of the clamping spring from the clamping position into the release position, the actuating element being movable in an actuating direction oriented transversely to the direction of the displacement movement of the guide element, wherein the actuating element has a display element configured to indicate a connection state of the electrical conductor.

2. The connection arrangement of claim 1, wherein the display element is formed on an end section of the actuating element which in a connected state of the conductor projects from an opening of the housing.

3. The connection arrangement of claim 2, wherein the display element comprises a wedge-shaped extension on the end section of the actuating element.

4. The connection arrangement of claim 1, wherein the actuating element has a tool receiving region, and wherein the display element is arranged adjacent to the tool receiving region.

5. The connection arrangement of claim 1, wherein the clamping spring is arranged between the section of the busbar and the actuating element.

6. The connection arrangement of claim 1, wherein the guide element has at least one spring contact edge on which the clamping leg is configured to rest.

7. The connection arrangement of claim 6, wherein the clamping leg has two slide sections each arranged laterally in relation to a main section having a clamping edge, wherein the guide element has two spring contact edges arranged at a distance from each other, and wherein a first slide section is configured to rest against a first spring contact edge and a second slide section is configured to rest against a second spring contact edge.

8. The connection arrangement of claim 1, wherein the guide element is displaceable such that the displacement movement of the guide element takes place transversely to an insertion direction of the conductor to be connected into the conductor connection space.

9. The connection arrangement of claim 1, wherein the release element is mounted tiltably relative to the guide element.

10. The connection arrangement of claim 1, wherein the release element has at least one undercut, which in the release position of the clamping leg of the clamping spring is configured to be latched with at least one latching lug of the guide element.

11. The connection arrangement of claim 1, wherein the guide element has two longitudinal side walls arranged parallel to each other, which delimit the conductor connection space on a first side and on a second side opposite the first side.

12. The connection arrangement of claim 1, wherein the guide element has a slide face along which the actuating element is guidable.

13. The connection arrangement of claim 12, wherein the slide face is arranged between the two longitudinal side walls of the guide element or on an end wall of the guide element.

14. The connection arrangement of claim 12, wherein the slide face has an inclined surface, which is configured to interacts with an inclined surface formed on the actuating element.

15. The connection arrangement of claim 1, wherein the actuating element has a latching region via which, in the release position of the clamping spring, the actuating element is holdable in a fixed position on the guide element.

16. The connection arrangement of claim 15, wherein the latching region is configured such that, in the release position of the clamping spring, the latching region surrounds the slide face of the guide element at least in regions.

17. The connection arrangement of claim 1, wherein the guide element is connected to a spring element to support a displacement movement of the guide element.

18. An electronic device, comprising:

at least one connection arrangement of claim 1.

19. A connection arrangement for connecting an electrical conductor, comprising:

a housing;

a busbar;

a clamping spring comprising a clamping leg transferrable into a clamping position and into a release position;

a conductor connection space formed between a section of the busbar and the clamping leg of the clamping spring;

a displaceably arranged guide element, which is in operative connection with the clamping leg of the clamping spring, the clamping leg being holdable in the release position by the guide element;

a release element, which, in the release position of the clamping leg of the clamping spring, is in engagement with the guide element, the release element during insertion of the conductor to be connected into the conductor connection space being actuatable thereby such that the release element comes out of engagement with the guide element and the guide element is displaceable by a spring force of the clamping leg such that the clamping leg is transferred into the clamping position in order to clamp the conductor against the busbar; and an actuating element, by which the guide element is displaceable in order to transfer the clamping leg of the clamping spring from the clamping position into the release position, wherein the actuating element has a display element configured to indicate a connection state of the electrical conductor, and wherein the release element has at least one undercut, which in the release position of the clamping leg of the clamping spring is configured to be latched with at least one latching lug of the guide element.

20. A connection arrangement for connecting an electrical conductor, comprising:

a housing;

a busbar;

a clamping spring comprising a clamping leg transferrable into a clamping position and into a release position;

a conductor connection space formed between a section of the busbar and the clamping leg of the clamping spring;

a displaceably arranged guide element, which is in operative connection with the clamping leg of the clamping spring, the clamping leg being holdable in the release position by the guide element;

a release element, which, in the release position of the clamping leg of the clamping spring, is in engagement with the guide element, the release element during insertion of the conductor to be connected into the conductor connection space being actuatable thereby such that the release element comes out of engagement with the guide element and the guide element is displaceable by a spring force of the clamping leg such that the clamping leg is transferred into the clamping position in order to clamp the conductor against the busbar; and an actuating element, by which the guide element is displaceable in order to transfer the clamping leg of the clamping spring from the clamping position into the release position, wherein the actuating element has a display element configured to indicate a connection state of the electrical conductor, and wherein the guide element has two longitudinal side walls arranged parallel to each other, which delimit the conductor connection space on a first side and on a second side opposite the first side.

* * * * *